Figure 1:
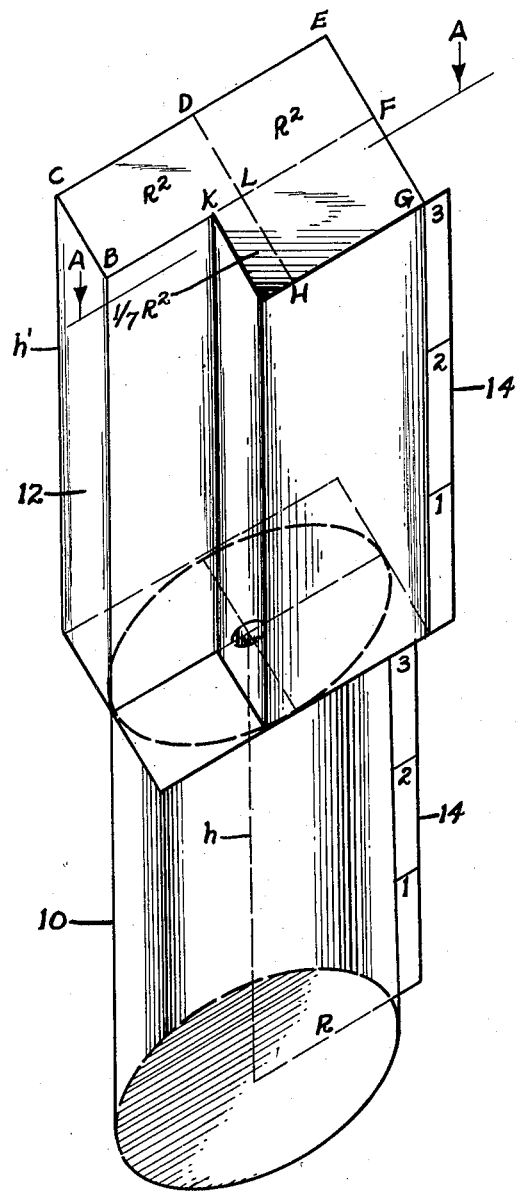

Sept. 8, 1959  H. J. FELDHAKE  2,902,778
MATHEMATICAL FORMULA DEMONSTRATOR
Filed March 27, 1959  5 Sheets-Sheet 1

INVENTOR.
HERBERT J. FELDHAKE
BY
Lawrence S. Epstein
ATTORNEYS

Sept. 8, 1959     H. J. FELDHAKE     2,902,778
MATHEMATICAL FORMULA DEMONSTRATOR Filed March 27, 1959     5 Sheets-Sheet 2

INVENTOR.
HERBERT J. FELDHAKE
BY
Lawrence S. Epstein
ATTORNEYS

Sept. 8, 1959     H. J. FELDHAKE     2,902,778
MATHEMATICAL FORMULA DEMONSTRATOR
Filed March 27, 1959     5 Sheets-Sheet 3

INVENTOR.
HERBERT J. FELDHAKE
BY
Lawrence S. Epstein
ATTORNEYS

Sept. 8, 1959  H. J. FELDHAKE  2,902,778
MATHEMATICAL FORMULA DEMONSTRATOR

Filed March 27, 1959  5 Sheets-Sheet 4

INVENTOR.
HERBERT J. FELDHAKE
BY
Lawrence S. Epstein
ATTORNEYS

Sept. 8, 1959 H. J. FELDHAKE 2,902,778
MATHEMATICAL FORMULA DEMONSTRATOR
Filed March 27, 1959 5 Sheets-Sheet 5

INVENTOR.
HERBERT J. FELDHAKE
BY
Lawrence S. Epstein
ATTORNEYS

United States Patent Office 2,902,778
Patented Sept. 8, 1959

2,902,778

MATHEMATICAL FORMULA DEMONSTRATOR

Herbert J. Feldhake, Chicago, Ill.

Application March 27, 1959, Serial No. 802,581

28 Claims. (Cl. 35—34)

(Granted under Title 35, U.S. Code (1952), sec. 266)

The invention described herein may be manufactured and used by or for the Government of the United States of America for governmental purposes without the payment of any royalties thereon or therefor.

This invention is a continuation-in-part of applications Serial Nos. 629,203, and 629,204, filed December 18, 1956 and 644,701 filed March 7, 1957, and relates to a device providing a physically meaningful demonstration of mathematical formulas and, in particular, to a device providing such a demonstration of the formula for the volume of a cylinder.

Mathematics is an abstract subject which is generally taught by means of symbols and figures drawn upon a blackboard. It is a well-known fact that many pupils find it difficult to learn by this method, but are aided in their learning by physical demonstrations of abstract principles and the properties of geometrical forms.

The present invention provides a device for demonstrating the physical meaning of mathematical formulas containing terms of the area and volume type (second and third order terms). Terms on one side of the formula are represented by areas or volumes formed in a containing structure preferably fabricated from transparent plastic material. Terms on the other side of the formula are represented by other areas or volumes of simple, easily comprehended, geometrical forms, such as squares, rectangles or cubes, equivalent in total area or volume, respectively, to the total area or volume of the terms on the first side of the formula. The areas or volumes representing the terms on one side of the formula communicate with those on the other side. A freely mobile fluid material, preferably spherical pellets, covers the total area or fills the total volume representing the terms on one side of the formula. Equivalence of both sides of the formula is demonstrated by transferring the fluid material to the areas or volumes corresponding to the terms on the other side of the formula.

An object of the invention is to provide a device particularly useful in teaching mathematics.

Another object is to provide a device capable of furnishing a physically meaningful demonstration of a mathematical formula containing second or third order terms.

A further object is to provide a device capable of furnishing a physically meaningful demonstration of the formula for the volume of a cylinder.

Another object is to provide a device capable of furnishing a physically meaningful demonstration of the formula for the volume of a sphere.

A further object is to provide a device capable of furnishing a physically meaningful demonstration of the formula for the volume of a prism.

Still another object is to provide a device which enables students to more quickly and easily understand the meaning of certain mathematical formulas and to remember them for a longer period of time.

Figure 2:
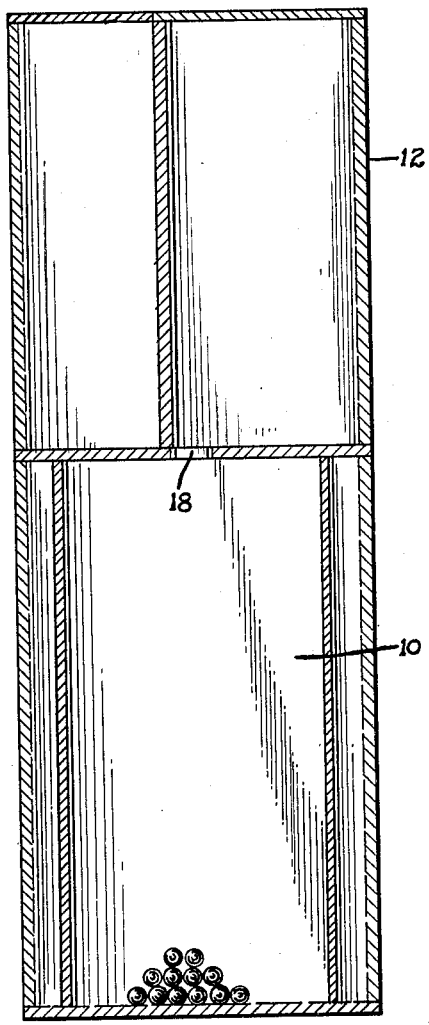
Figure 3:
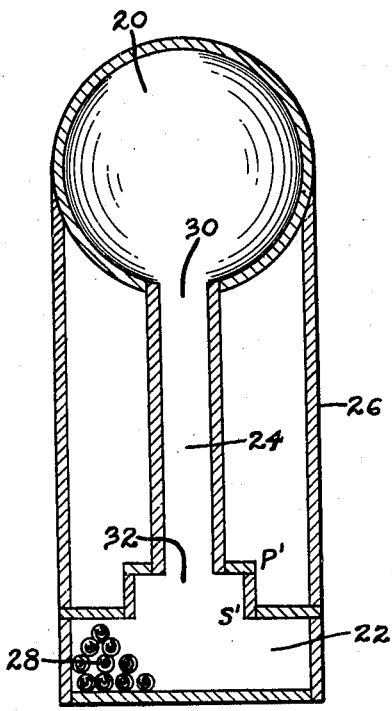
Figure 5:
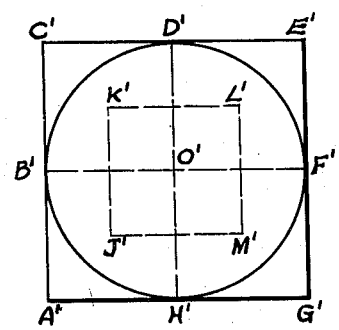
Figure 6:
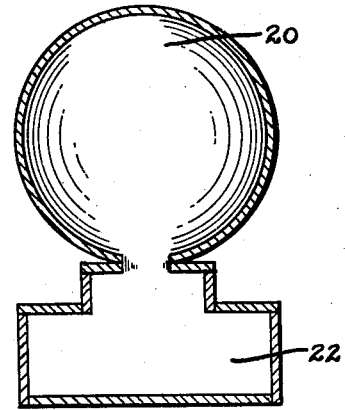
Figure 4:
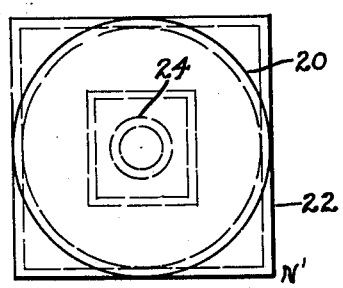
Figure 7:
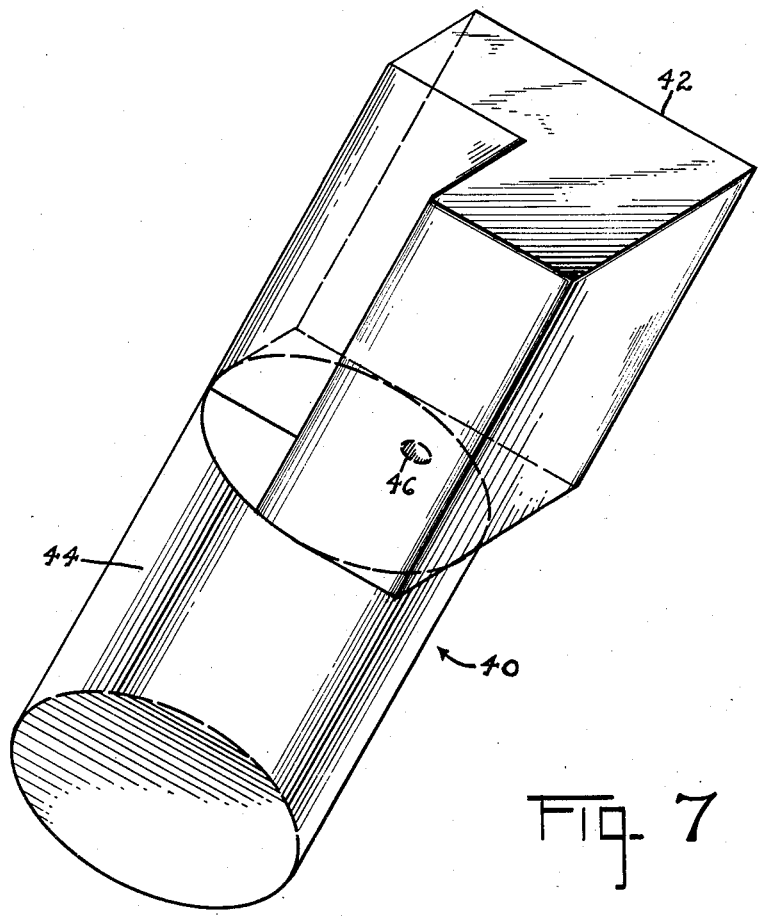
Figure 9:
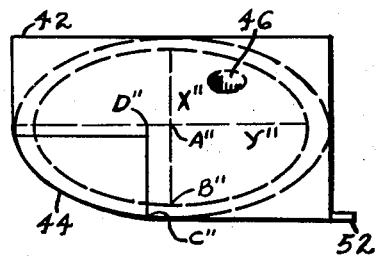
Figure 8:
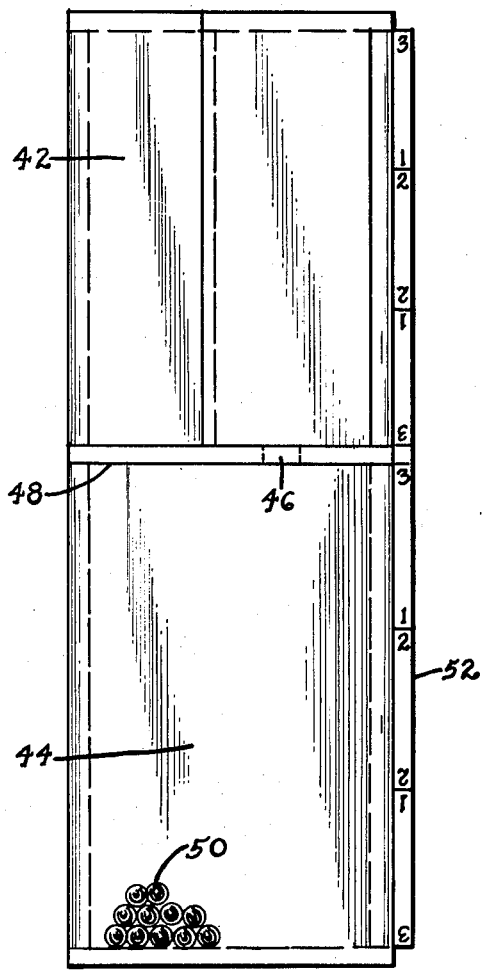
Figure 10:
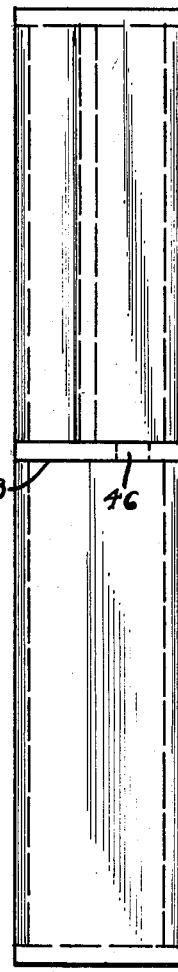

Other objects and many of the attendant advantages of this invention will be readily appreciated as the same becomes better understood by reference to the following detailed description when considered in connection with the accompanying drawings wherein:

Figure 1 is a diagrammatic representation of an embodiment of the invention,

Figure 2 is a cross-sectional view of the embodiment shown in Figure 1 taken along the line A—A, Figure 3 is a longitudinal cross-section through the center of an embodiment of the invention, Figure 4 is a top view of the embodiment shown in Figure 3, Figure 5 is a diagrammatic representation of a top view of the embodiment in Figure 3 clarifying the geometry of the invention, Figure 6 is a longitudinal cross-section through the center of a second embodiment of the invention, Figure 7 is a perspective view of another embodiment of the invention, Figure 8 is a front view of the embodiment, Figure 9 is a plan view of the embodiment, and Figure 10 is a side view of the embodiment.

Figure 1 is a diagrammatic representation of an embodiment of the invention. It is to be noted that wall thicknesses are omitted for the sake of clarity. A hollow cylinder 10 having a radius R and a height $h$ is attached at one end to a box-like geometrical structure 12.

The hollow box-like structure 12 has a height $h'$ equal to the height $h$ of the cylinder 10. This may be shown visually by attaching a straight-edge ruler 14 to both the box-like structure 12 and the cylinder 10, or by inscribing dimensional marks along the surfaces of the two geometrical structures, or any other suitable device.

The dimensions BF and DH of the box-like structure 12 are equal to the diameter of the cylinder 10. Therefore, the dimensions CD, DE, BL, LF, HG, CB, DL, LH, KJ, EF and FG are all equal to the radius R of the cylinder. Thus, the areas BCDL, DEFL and FGHL are all equal to $R^2$. The dimension JH is equal to $\frac{1}{7}$ HG or $\frac{1}{7}R$; therefore, the area HJKL equals $\frac{1}{7}R^2$. The box-like structure 12 is thus equivalent to four rectangles added together, three having a volume of $R^2h^1$ and one having a volume of $\frac{1}{7}R^2h^1$.

The formula for the volume of a cylinder is $\pi R^2h$. $\pi$ is a constant equal to 3.14159. The decimal .14159 is a close approximation of the fraction $\frac{1}{7}$. Thus, the formula $\pi R^2h$ is equivalent to $3R^2h+\frac{1}{7}R^2h$ and the latter formula is equivalent to the volumes of the four rectangles.

The internal volume of the cylinder 10 is completely filled with a freely mobile fluid material 16 (see Fig. 2), preferably spherical pellets such as marbles or buckshot, although any other suitable material such as sand, colored liquid, etc., may be employed. (Only a few pellets are indicated in Fig. 2.) A passage 18, large enough to permit transference of the pellets 16, provides communication between the internal voids of the cylinder 10 and the box-like structure 12.

Thus, by inverting the entire structure, the pellets 16 in the cylinder 10 are transferred to the box-like structure 12 through the passage 18. The pellets 16 completely fill the internal volume of the box-like structure 12, thereby physically demonstrating the equivalence of the volumes of the latter and the cylinder 10.

The two structures 10 and 12 may preferably be fabricated from a transparent plastic material, or from glass, or from any other suitable transparent material.

Figure 3 shows a longitudinal cross-section through the center of a structure consisting of a hollow sphere 20, a box-like member 22 and a pipe 24 providing communication between the two. Sidewalls 26 may be employed, if desired, to provide a mechanical support for the sphere 20 and the box-like member 22.

Either the sphere 20 or the box-like member 22 is completely filled with a freely mobile fluid material, preferably spherical pellets 28 such as marbles, or buckshot, although other materials such as sand or colored liquid may also be employed.

The structure is preferably fabricated from transparent material such as transparent plastic. Of course, other suitable materials, such as glass, wood, metal, etc., may be employed.

If non-transparent materials are utilized in fabricating the structure, the pipe 24 may be eliminated and the structure may comprise simply a separate sphere 20 and a box-like member 22. Assembly of the structure may be accomplished by temporarily clamping together the two members so that a passage is formed between them by contiguity of their apertures 30 and 32 (see Figure 6). The apertures 32 and 30 (and the interior of the pipe 24) must be sufficient to permit transfer between the members of at least one pellet 28 at a time.

If the structure is composed of transparent material, it may be fabricated as a single integral unit. A hole may be provided to fill the sphere 20 with the pellets 28, after which the hole may be sealed.

A top view of the embodiment is shown in Figure 4. This top view is simplified in Figure 5, so that the geometry of the embodiment may be demonstrated with more clarity.

The formula for the volume of a sphere is $4/3\pi R^3$, where R is the radius of the sphere and $\pi$ is a constant which equals 3.14159. The value of $4/3\pi$ is approximately equal to 4.189 or $4\frac{1}{5}$. Thus, the volume of a sphere is approximately equal to $4\frac{1}{5}R^3$.

The latter formula is equivalent to $4R^3 + \frac{1}{5}R^3$, and this is equivalent to the combined volumes of four cubes, each of which have a volume of $R^3$, and one rectangular prism which has a volume of $\frac{1}{5}R^3$.

The box-like member 22 has been designed to provide just such a volume. Figure 5 shows that the box-like member A'C'E'G' may be considered to be divided into four equal areas, A'B'O'H', B'C'D'O', O'D'E'F' and H'O'F'G', the sides of which are all equal to R', the radius of the sphere. Each area is thus equal to $R'^{(2)}$. The height N'O' (see Figure 3) of these four areas is also made equal to R', so that this part of the box-like member 22 is composed of four cubes, each having a volume of $R'^{(3)}$.

In addition, the box-like member 22 contains a second section, J'K'L'M', lying above the first. This second section is a rectangular prism, each side of which (J'K', K'L', L'M' and M'J') is equal to R', and the height of which (S'P'; see Figure 3) is equal to $\frac{1}{5}R'$. The volume of this section is equal to $\frac{1}{5}R'^{(3)}$. Thus, the total volume of the box-like member 22 may be visualized easily as composed of the volumes of four cubes and a rectangular prism whose total volume is $4\frac{1}{5}R'^{(3)}$, the same as the volume of the sphere 20.

To visually demonstrate the equivalence in volume, the structure is held so that the sphere 20 is on the bottom and becomes filled with the pellets 28. The structure is then inverted and the pellets 28 are seen to completely fill the internal volume of the box-like member 22.

Figure 7 shows a structure 40 which is composed of a box-like member 42 mounted upon one base of an elliptical prism 44. The two sections 42 and 44 are hollow, the internal volumes communicating with each other through a passageway formed by an aperture 46 drilled through the partition 48 which separates the sections. The partition 48 forms a common base for each of the sections (see Figure 8).

As shown in Figure 9, which is a plan view of the structure 40, a cross-section through the elliptical prism 44, taken parallel to the bases, is an ellipse having a major axis equal to 2Y", and a minor axis equal to 2X". Figure 9 also indicates that the box-like member 42 may be considered to be formed from four rectangular prisms, three of which have base areas equal to the product X"Y".

The fourth rectangular prism has a base area A"B"C"D" which is equal to $\frac{1}{7}X"Y"$, since sides A"D" and B"C" are equal to $\frac{1}{7}Y"$. Thus, the total base area of the box-like member 42 equals $3\frac{1}{7}X"Y"$, or $3\frac{1}{7}$ ($\frac{1}{2}$ minor axis)($\frac{1}{2}$ major axis).

The heights of the two sections are made equal and this fact may be indicated by affixing a ruling stick 52 to the side of the structure 40. The same result may be accomplished by simply painting or otherwise scribing dimensional marks along the surfaces of the sections to indicate their heights.

The box-like member 42 may also have its top surface painted or otherwise marked with the outline of the ellipse and its major and minor axes, so that it will be apparent that the top surface is equal in area to three and one-seventh rectangles, each having an area equal to the product of one-half the major axis and one-half the minor axis of the ellipse. If this is done, the result would appear somewhat like the dotted inner wall of the elliptical prism and the dotted lines X" and Y" as shown in Figure 9. It should be noted, however, that the lower left-hand quadrant of the ellipse (as seen in Figure 9) would have to be marked on the top surface of the elliptical prism.

The sections preferably are fabricated from transparent material such as transparent plastic or glass, although any other suitable material such as metal or wood may be utilized.

If transparent material is employed, the structure 40 may be built as a single integrated unit. If non-transparent material is employed, the sections 42 and 44 should be fabricated independently and fastened together with suitable removable clamps, thereby permitting inspection of the interior volumes through the aperture 46. When built as an independent unit, each section should be formed with its own pair of bases, of course.

The interior volume of the elliptical prism 44 is completely filled with a freely mobile fluid material. This freely mobile material preferably consists of spherical pellets 50 such as marbles or buckshot, although fluids such as sand or colored liquid may be employed. If liquids are employed, the structure 40 must be leakproof.

The formula for the volume of an elliptical prism is $\pi XYH$, where $\pi$ is a constant equal to $3\frac{1}{7}$, X" equals $\frac{1}{2}$ the minor axis of the ellipse, Y" equals $\frac{1}{2}$ the major axis of the ellipse and H" equals the height of the prism. As shown before, the base area of the box-like member 42 equal to $3\frac{1}{7} X"Y"$; its volume therefore is equal to $3\frac{1}{7} X"Y"H"$, which is the same as the volume of the elliptical prism 44.

To physically demonstrate the equivalence of the volume of the elliptical prism 44 to the volume of the box-like member 42, the structure 40 is inverted. The pellets 50, which had previously completely occupied the interior volume of the elliptical prisms 44, can now be seen to completely occupy the interior volume of the boxlike member 42.

Obviously many modifications and variations of the present invention are possible in the light of the above teachings. It is therefore to be understood that within the scope of the appended claims the invention may be practiced otherwise than as specifically described.

What I claim is:

1. A device for providing a physical demonstration of the mathematical formula for the volume of a cylinder comprising: a hollow cylindrical structure; a hollow, box-like structure having an internal volume equal to the internal volume of said cylindrical structure, each said structure being formed with an aperture and said structures being secured together so that said apertures fit together to form a passage providing communication between the internal hollows of said structure; and freely mobile fluid material in sufficient amount to completely occupy the internal hollow of said cylindrical structure, said passage being of sufficient width to permit transfer of said material between said structures.

2. A device as set forth in claim 1, wherein said box-like structure is equivalent to a structure formed by adding together three rectangles, each having a volume equal to the height times the square of the radius of said cylindrical structure, and a fourth rectangle having a volume equal to one-seventh the volume of any of the other rectangles.

3. A device as set forth in claim 2, wherein said structures are fabricated from a transparent plastic material.

4. A device as set forth in claim 2, wherein said freely mobile fluid material comprises spherical pellets.

5. A device for providing a physical demonstration of the mathematical formula for the volume of a cylinder comprising: a cylindrical structure; a quasi-rectangular structure formed like a rectangle having a rectangular portion excised therefrom, each said structure having equally dimensioned internal volumes and each formed with an aperture, said structures being secured together so that said apertures fit together to form a passage providing communication between the internal volumes of said structures; and freely mobile fluid material in sufficient amount to completely occupy the internal volume of said cylindrical structure, said passage being of sufficient width to permit transfer of said material between said structures.

6. A device as set forth in claim 5, wherein said excised rectangular portion of said box-like structure has a volume equal to six-sevenths of the value of the height times the square of the radius of said cylindrical structure.

7. A device as set forth in claim 5, wherein said structures are fabricated from transparent plastic material.

8. A device as set forth in claim 5, wherein said freely mobile fluid material comprises spherical pellets.

9. A device for providing a physical demonstration of the mathematical formula for the volume of a sphere comprising: a hollow sphere formed with an aperture in its wall; a box-like member having a volume equal to the volume of said sphere and formed with an aperture in its wall, said sphere and box-like member being secured together so that said apertures are in contiguity thereby forming a passage providing communication between the internal volumes of said sphere and box-like member; and freely mobile fluid material in sufficient amount to completely occupy the internal volume of said sphere, said passage being of sufficient dimension to permit transfer of said material between said sphere and said box-like member.

10. A device as set forth in claim 9, wherein the structure of said box-like member is equivalent to the combination of five structures, four comprising cubes having sides equal to the radius of said sphere, and the fifth comprising a rectangular prism having a base area with sides equal to the radius of said sphere and a height equal to one-fifth the radius of said sphere.

11. A device as set forth in claim 10, wherein said device is fabricated from transparent plastic material.

12. A device as set forth in claim 10, wherein said freely mobile fluid material comprises spherical pellets.

13. A device for providing a physical demonstration of the mathematical formula for the volume of a sphere comprising: a hollow sphere formed with an aperture in its wall; a box-like member having a volume equal to the volume of said sphere and formed with an aperture in its wall; a pipe member fitted at one end to the aperture in said sphere and at the other end to the aperture in said box-like member, thereby forming a passage providing communication between the internal volumes of said sphere and box-like member; and freely mobile fluid material in sufficient amount to completely occupy the internal volume of said sphere, said passage being of sufficient dimension to permit transfer of said material between said structures.

14. A device as set forth in claim 13, wherein the structure of said box-like member is equivalent to the combination of five structures, four comprising cubes having sides equal to the radius of said sphere, and the fifth comprising a rectangular prism having a base area with sides equal to the radius of said sphere and a height equal to one fifth the radius of said sphere.

15. A device as set forth in claim 14, wherein said device is fabricated from transparent plastic material.

16. A device as set forth in claim 14, wherein said freely mobile material comprises spherical pellets.

17. A device providing a physical demonstration of the mathematical formula for the volume of an elliptical prism comprising in combination: a hollow elliptical prism having at least one complete base; a hollow prism-like polyhedron comprising six faces shaped like parallelograms and at least one complete base whose area is a gnomon equivalent to the sum of three rectangles having two sides equal to one-half the major axis and two sides equal to one-half the minor axis of the base ellipse of said prism and one rectangle having two sides equal to one-half the minor axis and two sides equal to one-seventh the major axis of the base ellipse of said prism, the height of said faces being at least equal to that of said elliptical prism, said prism being adapted to be coupled endwise to said polyhedron; partitioning means lying in the conjunctive base plane between said prism and polyhedron, said partitioning means being at least of sufficient extent to cover any non-common areas in the conjunctive base plane when said prism and polyhedron are coupled together and yet providing an area of communication between the interior vloumes of said prism and polyhedron; and freely mobile fluid material in sufficient quantity to completely occupy the interior volume of said elliptical prism.

18. A device as set forth in claim 17, wherein said prism and polyhedron are fabricated from transparent plastic material.

19. A device as set forth in claim 17, wherein said prism and polyhedron are fabricated from transparent plastic material and coupled together permanently in an integrated unit.

20. A device as set forth in claim 17, wherein said freely mobile fluid material comprises spherical pellets, and said area of communication is of sufficient dimension to allow free passage of said pellets between the interior volumes of said prism and polyhedron.

21. A device as set forth in claim 17, wherein the heights of said prism and polyhedron are visibly marked off in dimensional units.

22. A device as set forth in claim 17, wherein the outer base of said polyhedron is marked with lines showing the major and minor axes of the base ellipse of said prism.

23. A device for providing a physical demonstration of the mathematical formula for the volume of an elliptical prism comprising, in combination: a hollow structure comprising an elliptical prism formed with an aperture in one base and a second prism also formed with an aperture in one base, said prisms coupled together base-to-base so that said two apertures form a single passageway between the interior volumes of said prisms, the base area of said second prism being a gnomon equivalent to the sums of three rectangles having two sides equal to one-half the major axis and two sides equal to one-half the minor axis of the base ellipse of said elliptical prism and one rectangle having two sides equal to one-half the minor axis and two sides equal to one-seventh the major axis of the base ellipse of said elliptical prism, the height of said second prism being at least eqaul to the height of said elliptical prism; and freely mobile fluid material in sufficient amount to completely occupy the internal volume of said elliptical prism.

24. A device as set forth in claim 23, wherein said prisms are fabricated from transparent plastic material.

25. A device as set forth in claim 23, wherein said prisms are fabricated from transparent plastic material and coupled together permanently in an integrated unit.

26. A device as set forth in claim 23, wherein said freely mobile fluid material comprises spherical pellets and said passageway between said prisms is of sufficient dimension to allow free passage of said pellets between the internal volumes of said prisms.

27. A device as set forth in claim 23, wherein the heights of said prisms are visibly marked off in dimensional units.

28. A device as set forth in claim 23, wherein the outer base of said second prism is marked with lines showing the major and minor axes of the base ellipse of said elliptical prism.

References Cited in the file of this patent

UNITED STATES PATENTS

| | | |
|---|---|---|
| 296,018 | Kennedy | Apr. 1, 1884 |
| 595,455 | Glidden | Dec. 14, 1897 |
| 610,577 | Baldwin | Sept. 13, 1898 |
| 639,941 | Rossi-Diehl | Dec. 26, 1899 |
| 747,711 | Hollingsworth | Dec. 22, 1903 |

FOREIGN PATENTS

| | | |
|---|---|---|
| 175,084 | Austria | June 10, 1953 |
| 22,006 | Great Britain | 1903 |